United States Patent
Zhou et al.

(10) Patent No.: US 7,440,894 B2
(45) Date of Patent: Oct. 21, 2008

(54) METHOD AND SYSTEM FOR CREATION OF VOICE TRAINING PROFILES WITH MULTIPLE METHODS WITH UNIFORM SERVER MECHANISM USING HETEROGENEOUS DEVICES

(75) Inventors: Nianjun Zhou, Somers, NY (US); Amarjit S. Bahl, Brookfield, CT (US); Michael Van Der Meulen, Redding, CT (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 11/199,959

(22) Filed: Aug. 9, 2005

(65) Prior Publication Data

US 2007/0038459 A1    Feb. 15, 2007

(51) Int. Cl.
*G10L 15/06* (2006.01)
*G10L 15/00* (2006.01)
*G10L 21/00* (2006.01)

(52) U.S. Cl. .............. 704/243; 704/270.1; 704/231

(58) Field of Classification Search ........ None
See application file for complete search history.

(56) References Cited

U.S. PATENT DOCUMENTS

| | | | |
|---|---|---|---|
| 6,035,273 A | 3/2000 | Spies | |
| 6,185,527 B1 | 2/2001 | Petkovic et al. | |
| 6,185,532 B1 | 2/2001 | Lemaire et al. | |
| 6,442,519 B1* | 8/2002 | Kanevsky et al. | ............ 704/243 |
| 6,463,413 B1* | 10/2002 | Applebaum et al. | ...... 704/256.2 |
| 6,747,685 B2 | 6/2004 | Taib et al. | |
| 6,785,647 B2* | 8/2004 | Hutchison | .................... 704/231 |
| 6,816,834 B2 | 11/2004 | Jaroker | |
| 2003/0195751 A1* | 10/2003 | Schwenke et al. | ......... 704/270.1 |
| 2006/0206333 A1* | 9/2006 | Paek et al. | .................. 704/260 |

OTHER PUBLICATIONS

W. J. Johnson et al., "IBM Technical Disclosure Bulletin", vol. 37, No. 03, pp. 255-257 (Mar. 1994).

* cited by examiner

*Primary Examiner*—David R. Hudspeth
*Assistant Examiner*—Matthew J. Sked
(74) *Attorney, Agent, or Firm*—Scully, Scott, Murphy & Presser, P.C.; Derek S. Jennings (57) ABSTRACT

A system and method for creating user voice profiles enables a user to create a single user voice profile that is compatible with one or more voice servers. Such a system includes a training server that receives audio information from a client associated with a user and stores the audio information and corresponding textual information. The system further includes a training server adaptor. The training server adaptor is configured to receive a voice profile format and a communication protocol corresponding to one of the plurality of voice servers, convert the audio information and corresponding textual information into a format compatible with the voice profile format and communication protocol corresponding to the one of the plurality of voice servers, and provide the converted audio information and corresponding textual information to the one of the plurality of voice servers.

1 Claim, 5 Drawing Sheets

METHOD AND SYSTEM FOR CREATION OF VOICE TRAINING PROFILES WITH MULTIPLE METHODS WITH UNIFORM SERVER MECHANISM USING HETEROGENEOUS DEVICES

TECHNICAL FIELD

The invention relates generally to the field of continuous speech recognition for non-constrained vocabulary and more particularly to creating and managing user voice profiles and storing the user voice profiles in a common repository to be used by a plurality of speech recognition systems.

BACKGROUND INFORMATION

Generally, products with a voice recognition feature, such as cell phones, PDAs, computers, automatic teller machines, security systems, and global positioning systems, for example, require installing software on the device itself for voice training. Software of this type typically requires the particular device to have a large storage capacity (e.g. memory, hard disk), and a powerful CPU to create and store a voice training profile.

Further, a particular voice training profile is only compatible with, and resides on, the device with which the particular voice training profile was created. This makes the use of that particular voice training profile limited. Further still, when the underlying voice training/transcription server (i.e. the device itself or a backend device with which the device communicates) is changed, a new voice training profile must be created.

Moreover, devices with small display screens make it very difficult to display text used for training a system with a voice recognition feature. As a result, a user has to constantly scroll vertically and horizontally to read the voice training text.

SUMMARY OF THE INVENTION

The invention relates generally to the field of speech recognition and more particularly to creating and managing user voice profiles and storing the user voice profiles in a common repository to be used by a plurality of speech recognition systems.

In one aspect, the invention involves a system for creating a user voice profile that is compatible with a plurality of voice servers. The system includes a training server that receives audio information from a client associated with a user and stores the audio information and corresponding textual information. The system further includes a training server adaptor that is configured to receive a voice profile format and a communication protocol corresponding to at least one of the plurality of voice servers. The training server adaptor is further configured to convert the audio information and corresponding textual information into a format compatible with the voice profile format and communication protocol corresponding to the at least one of the plurality of voice servers. The training server adaptor is still further configured to provide the converted audio information and corresponding textual information to at least one of the plurality of voice servers.

In one embodiment, the corresponding textual information is received from the client. In another embodiment, the textual information is provided by the training server. In yet another embodiment, the system includes a data storage repository for storing the textual information and the corresponding audio information. In another embodiment, the system includes a user interface that is configured for providing and receiving at least text and corresponding audio information. The user interface includes a display for viewing at least the textual information, and a microphone for recording the audio information corresponding to the textual information. In still another embodiment, the system includes a voice transcription server for transcribing received audio information. In yet another embodiment, the system includes training material, which includes a plurality of textual information that is transmitted to a client for a user to read. In other embodiments, the system includes a training selection module that is configured to provide a plurality of voice training choices. In another embodiment, the system includes a function selection module that is configured to provide a plurality of virtual profile management functions. In yet another embodiment, the system includes a feedback module that is configured to provide an alert that a particular virtual profile is faulty. In yet another embodiment, the system includes a notification module that is configured to alert at least one of the plurality of voice servers that a particular virtual profile has been updated.

In another aspect, the invention involves a method of creating a user voice profile for a plurality voice servers. The method includes displaying text for a user to read, receiving an audio representation of the text from the user, creating a virtual profile by storing the text and the corresponding audio representation of the text, converting the text and the corresponding audio representation of the text into a format compatible with at least one of the plurality of voice servers; and providing the text and the corresponding audio representation of the text to at least one of the plurality of voice servers.

In one embodiment, the method includes storing the status of the creation of the virtual profile by storing how much text has been read by the user. In another embodiment, creating the virtual profile includes storing the text and the corresponding audio representation of the text in a data repository. In still another embodiment, the method includes detecting the type of display device used and automatically formatting the text based on the type of display device used. In other embodiments, the method includes formatting the text in response to the user indicating the type of display device used. In another embodiment, the method includes receiving feedback regarding the quality of the transmitted text and corresponding audio representation of the text from at least one of the plurality of voice servers. In yet another embodiment, the method includes providing to at least one of the plurality of voice servers a notification when the text and corresponding audio representation of the text have changed.

In yet another aspect, the invention involves a method of creating a user voice profile for a plurality voice servers. The method includes receiving text from a user, receiving an audio representation of the text from the user, creating a virtual profile by storing the text and the corresponding audio representation of the text, converting the text and the corresponding audio representation of the text into a format compatible with at least one of the plurality of voice servers, and providing the text and the corresponding audio representation of the text to the at least one of the plurality of voice servers.

In one embodiment, the method includes transcribing the audio input from the user, providing the transcript back to the user, and receiving a corrected transcript from the user. In another embodiment, creating the virtual profile includes storing the text and the corresponding audio representation of the text in a data repository. In yet another embodiment, the method includes detecting the type of display device used and automatically formatting the text based on the type of display device used. In still another embodiment, the method includes formatting the text in response to the user indicating the type of display device used. In some embodiments, the method includes receiving feedback regarding the quality of the transmitted text and corresponding audio representation of the text from the at least one of the plurality of voice servers. In another embodiment, the method includes providing to at least one of the plurality of voice servers a-notification when the text and corresponding audio representation of the text have changed.

In still another aspect, the invention involves a method of creating a user voice profile for a plurality voice servers. The method includes receiving audio information from a user, transcribing the audio information, and providing the corresponding textual information to the user. The method further includes receiving edited corresponding textual information from the user, and creating a virtual profile by storing the audio information and the edited corresponding textual information. The method still further includes converting the audio information and the edited corresponding textual information into a format compatible with at least one of the plurality of voice servers, and providing the audio information and the edited corresponding textual information to the at least one of the plurality of voice servers.

In yet another aspect, the invention involves a program storage device readable by a machine, tangibly embodying a program of instructions executable by the machine to perform method steps for creating a user voice profile that is compatible with a plurality voice servers. The method steps include receiving audio information from a user, and creating a virtual profile by storing the audio information and corresponding textual information. The method steps further include converting the audio information and corresponding textual information into a format compatible with at least one of the plurality of voice servers, and providing the audio information and corresponding textual information to the at least one of the plurality of voice servers.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

The invention relates generally to the field of speech recognition and more particularly to creating and managing user voice profiles and storing the user voice profiles in a common repository to be used by a plurality of speech recognition systems.

Figure 1:
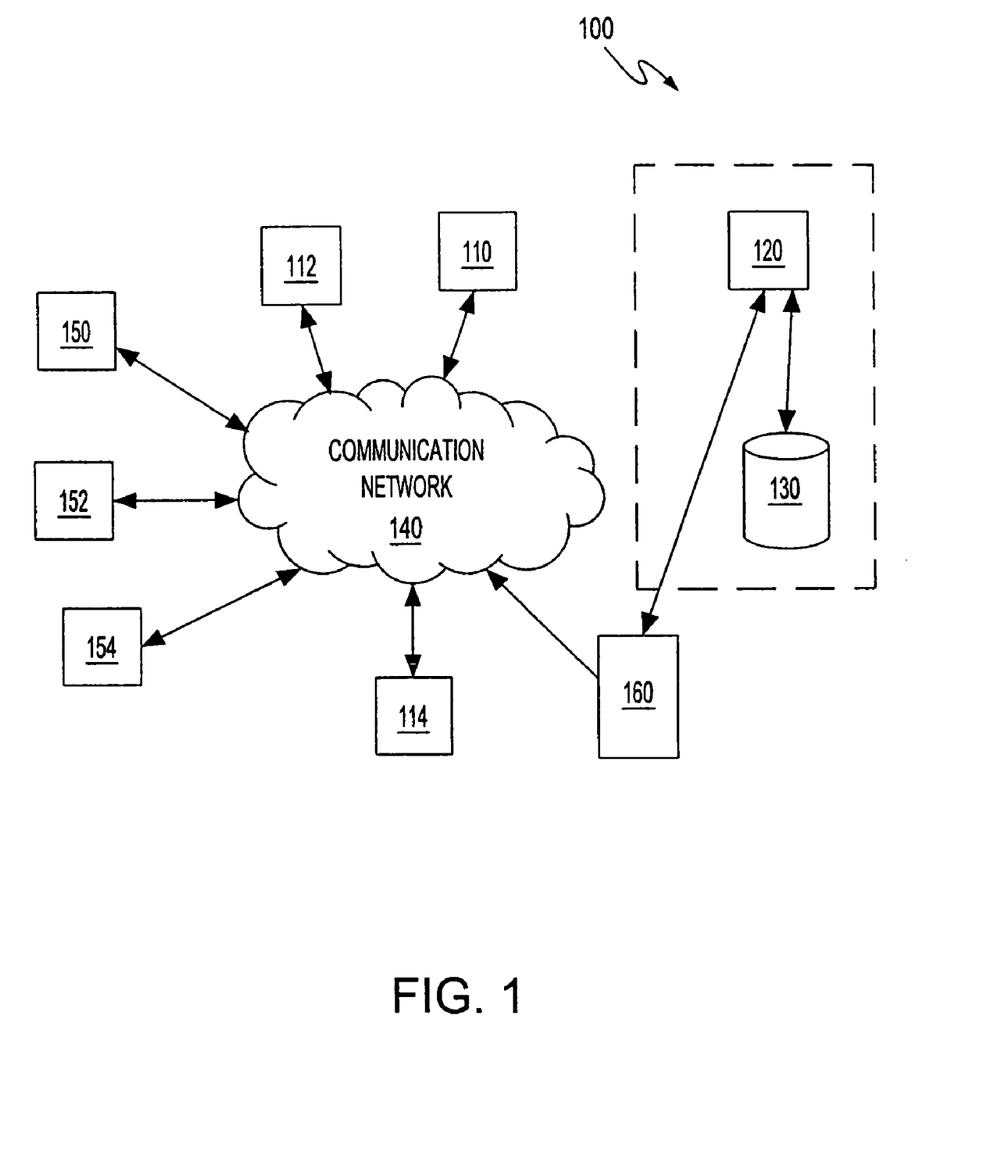
FIG. 1 is an illustrative block diagram of a voice training system in communication with a communication network according to one embodiment of the invention.

Referring to FIG. 1, in one embodiment, a voice profile training and management system 100 is in communication with a communication network 140, such as the Internet, or the World Wide Web, for example. The voice training system 100 is also in communication with a plurality of voice servers 110, 112, 114, and a plurality of client systems 150, 152, 154, via the communication network 140. In other embodiments, there can be more or less voice servers 110, 112, 114 and client systems 150, 152, 154. The client systems 150, 152, 154 can be any of a variety of devices including, but not limited to: cell phones, computers, PDAs, GPS systems, ATM machines, home automation systems, and security systems, for example. Further, the client systems 150, 152, 154 include a display device (e.g. monitor, screen, etc.) and a microphone. In the present embodiment, the voice training system 100 includes a voice training server 120, a data repository 130, and a voice transcription server 160. In various embodiments, the voice transcription server can be directly connected to the voice training server 120, connected to the voice training server 120 via the communication network 140, or reside on the voice training server 120. In another embodiment, the data repository 130 resides on the voice training server 120. The data repository 130 is a database system such as relational database management system (RDBMS) or lightweight directory access protocol (LDAP), for example, or such equivalents known in the art.

In other embodiments, the voice profile training system 100 is a stand-alone system not requiring the communication network 140 and is in direct communication with the plurality of voice servers 110, 112, 114, and the plurality of clients 150, 152, 154.

Figure 2:
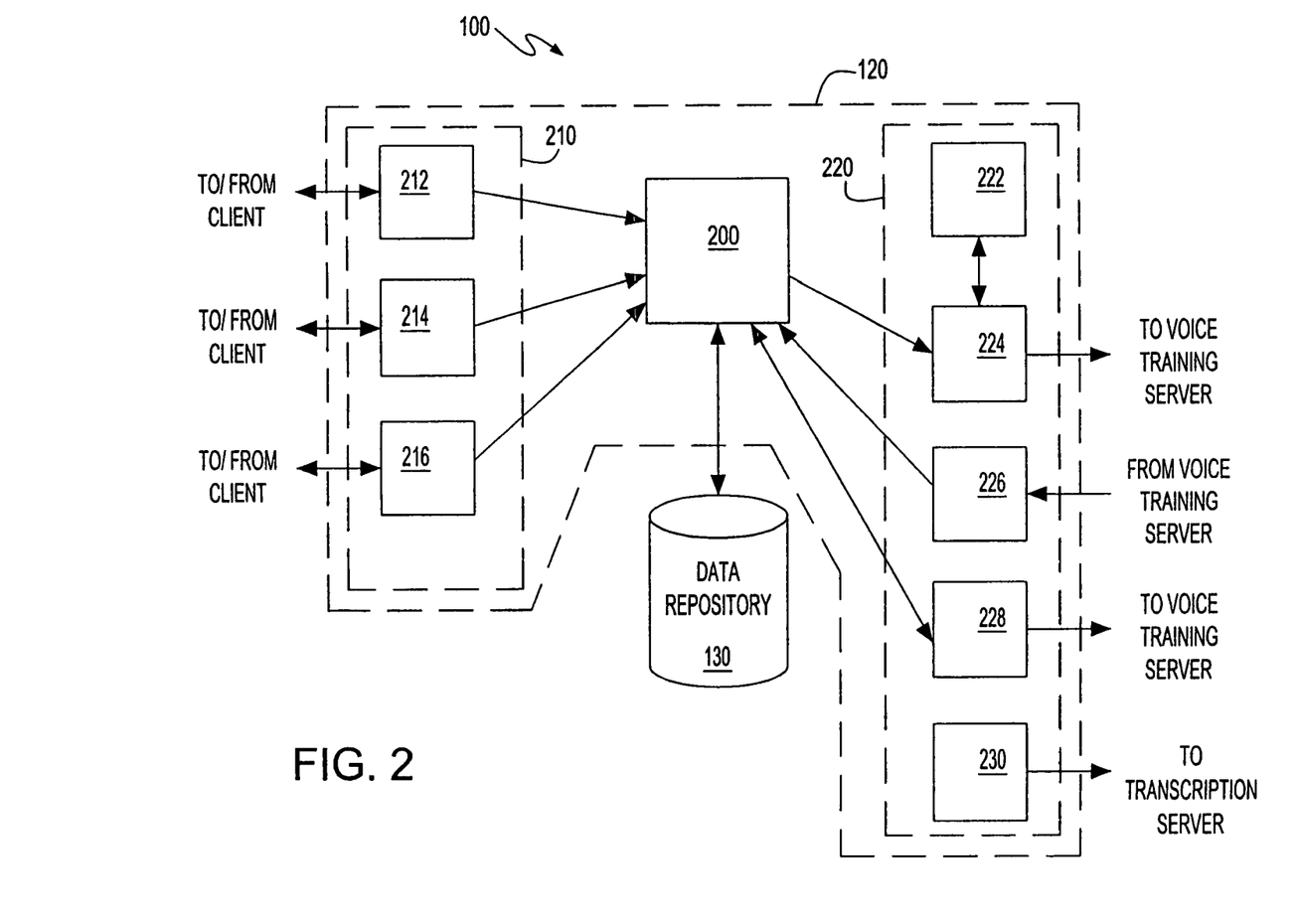
FIG. 2 is an illustrative block diagram of a voice training system, according to another embodiment of the invention.

Referring to FIG. 2, as previously mentioned, in one embodiment, the voice training system 100 includes the voice training server 120 and the data repository 130. The voice training server 120 includes a training module 210, a function selection module 200, and a service module 220. The training module 210 is an application program interface (API such as web service or HTTP calls, for example) and includes a system initiated training module 212, a user initiated training module 214, and a feedback training module 216. The function selection module 200 is an API and controls functions including, but not limited to: adding a virtual voice profile, deleting a virtual voice profile, updating a virtual voice profile, and selecting a virtual voice profile. The service module 220 is an API and includes an audio format converter 222, a training server adaptor 224, a feedback module 226, a notification module 228, and a deployment module 230.

Returning back to FIG. 1, the present invention involves systems and methods for creating user voice profiles compatible with at least one of the plurality of clients 150, 152, 154 and at least one of the plurality of voice servers 110, 112, 114. To create a user voice profile on a system or device (client 150, 152, 154, for example) that employs a voice recognition/response feature, the system or device (client 150, 152, 154) must be trained to understand a particular user's voice. However, rather than create and store the user voice profile locally on the particular device (client 150, 152, 154), the present invention involves a universal or virtual user voice profile that is created and stored remotely. This virtual user voice profile can then be converted to any of a plurality of formats and transmitted to a remote voice server 110, 112, 114 that services the particular device (client 150, 152, 154) that the voice profile was created for.

For example, many cell phones have a voice recognition feature by which a user can speak a name into the handset and the phone number associated with the spoken name is dialed. In this case, the voice profile is created and stored locally on the cell phone. With the present invention, the user would call his/her cell phone service provider, speak the name into the handset, and the appropriate number would be dialed. In this case, the voice profile is created and stored remotely, rather than on the cell phone itself.

In one embodiment, the present invention includes three methods for creating a user voice profile. These methods include system initiated training, user initiated training, and feedback based training. Each of these methods will be discussed in further detail below.

Figure 3:
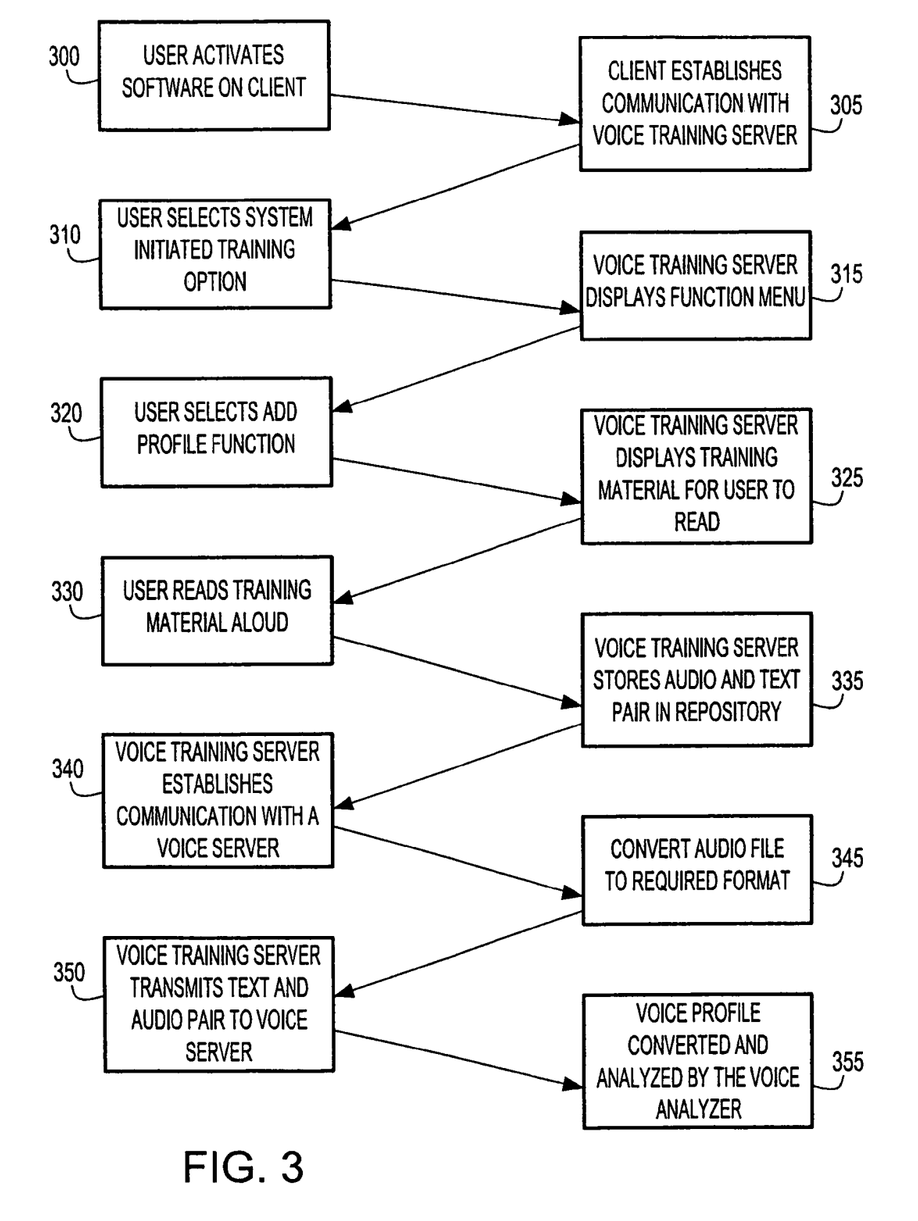
FIG. 3 is an illustrative flow diagram of the operation of a voice training system, according to one embodiment of the invention.

Referring to FIGS. 1, 2, and 3, in one embodiment, the system initiated training method for creating a user voice profile includes the following steps: a user operating a device (client 150, 152, 154), such as a cell phone, security system, or a home automation system, for example, activates the appropriate software (web browser with applet, specific web interface program, etc.) to initiate voice training. for the particular client 150, 152, 154 (Step 300). The software on the client 150, 152, 154 establishes communication with the voice training server 120 via the communication network (Step 305). Once communication is established with the voice training server 120, the voice training server 120 presents the user with a choice of system initiated training, user initiated training, or feedback training. In an example embodiment depicted in FIG. 3, it is assumed the user selects system initiated training (Step 310), which activates the system initiated training module 212.

Next, the function selection module 200 displays to the user a function menu (Step 315). The function menu includes such functions as add, delete, update, and select a virtual voice profile. Adding a virtual profile allows the user to create a new virtual profile. Deleting a virtual profile allows to user to delete an existing virtual profile. Updating a virtual profile allows the user to continue making, or change an existing virtual profile. Selecting a virtual profile allows the user to select a particular virtual profile if the user has previously created more than one virtual profile.

The user then selects a function to execute, for example, add (create) a new virtual profile (Step 320). The voice training server 120 then retrieves from storage (either from local memory or from the data repository 130) voice training material and displays it on the screen associated with client device 150, 152, 154 for the user to read (Step 325). The voice training material is text that the user must read aloud in order to create a voice profile. Next, the user reads the text aloud into the microphone associated with the client system 150, 152, 154 (Step 330). The audio representation of the text is then stored along with the text in the data repository 160 (Step 335). The text and audio pair is the virtual profile.

In an alternative embodiment, the voice training server 120 retrieves from storage (either S from local memory or from the data repository 130) voice training material that is an audio file. The voice training server 120 plays the training material audio file over a speaker that is associated with client device 150, 152, 154 so the user can hear it. The user then repeats the training material aloud into the microphone associated with the client system 150, 152, 154. The user's audio version of the training material is then stored in the data repository 160.

After the virtual profile has been created, or even after only a partial virtual profile has been created (discussed in detail below), the virtual voice profile is retrieved from the data repository 130 and the training server adaptor 224 within the service module 220 on the voice training server 120 establishes communication with a particular voice server 110, 112, 114 to determine the communication protocol and voice profile format that is compatible with the particular voice server 110, 112, 114 (Step 340). Next, the training server adapter 224 instructs the audio format converter 222 to convert the audio portion of the virtual voice profile to the particular audio format (e.g. .wav, .pcm, .au, .mp3, .wma, .qt, .ra/ram) that is compatible with the particular voice server 110, 112, 114 (Step 345). The training server adaptor 224 then transmits the text and the converted audio file to the particular voice server 110, 112, 114 via. the communication network 140 according to the particular communication protocol compatible with the particular voice server 110, 112, 114 (Step 350). Once the converted virtual voice profile has been sent to the particular voice server 110, 112, 114, the converted virtual voice profile is handled by a voice analyzer to create a voice spectrum file and tested to determine the profile's quality (Step 355). If the voice spectrum file is adequate, the process is finished and the user can now use the voice recognition feature of the particular device 150, 152, 154 that the voice profile was created for. If, on the other hand, the voice spectrum is inadequate or faulty, the voice server 110, 112, 114 contacts the feedback module 226 on the voice training server 120 to indicate that the voice profile is faulty. The voice training server 120, in turn, contacts the client 150, 152, 154 from which the voice profile creation was initiated. The user must then perform the voice profile creation process again until the particular voice server 110, 112, 114 determines that the voice profile is adequate.

Figure 4:
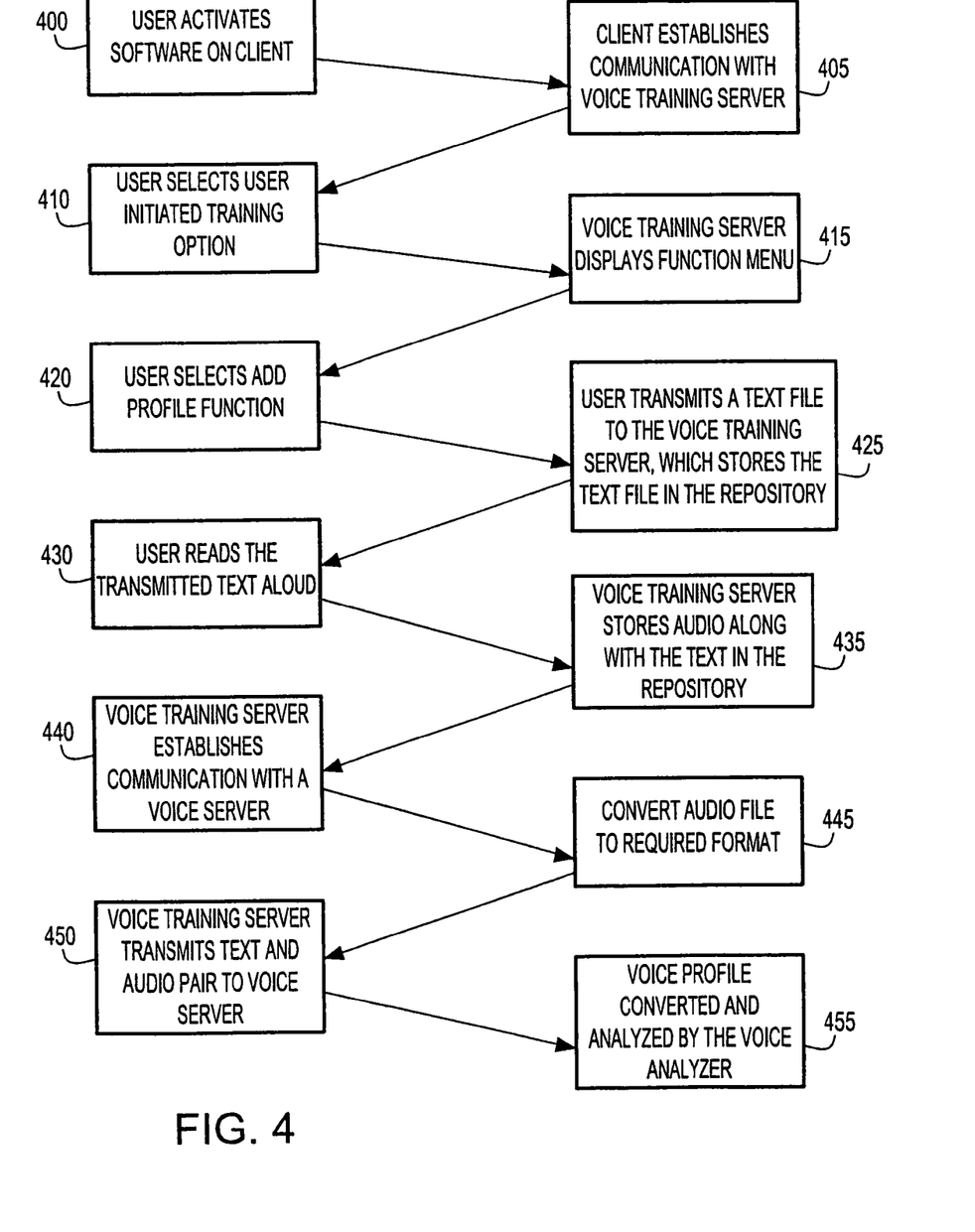
FIG. 4 is an illustrative flow diagram of the operation of a voice training system, according to another embodiment of the invention.

Referring to FIGS. 1, 2, and 4, in another embodiment, the user initiated training method for creating a user voice profile includes the following steps: a user operating a device (client 150, 152, 154), such as a cell phone, security system, or a home automation system, for example, activates the appropriate software (web browser with applet, specific web interface program, etc.) to initiate voice training for the particular client 150, 152, 154 (Step 400). The software on the client 150, 152, 154 establishes communication with the voice training server 120 via the communication network (Step 405). Once communication is established with the voice training server 120, the voice training server 120 presents the user with a choice of system initiated training, user initiated training, or feedback training. In this particular case, the user selects user initiated training (Step 410), which activates the user initiated training module 214.

Next, the function selection module 200 displays to the user a function menu (Step 415). The function menu includes such functions as add, delete, update, and select a virtual voice profile, as previously discussed above. The user then selects a function to execute, for example, add (create) a new virtual profile (Step 420). The user transmits a text file to the voice training server 120, which is subsequently stored in the data repository 130 (Step 425). Next, the user reads the text aloud into the microphone associated with the client system 150, 152, 154 (Step 430). The audio representation of the text is then stored along with the previously transmitted text in the data repository 160 (Step 435). The text and audio pair is the virtual profile.

After the virtual profile has been created, or even after only a partial virtual profile has been created (discussed in detail below), the virtual voice profile is retrieved from the data repository 130 and the training server adaptor 224 within the service module 220 on the voice training server 120 establishes communication with a particular voice server 110, 112, 114 to determine the communication protocol and voice profile format that is compatible with the particular voice server 110, 112, 114 (Step 440). Next, the training server adapter 224 instructs the audio format converter 222 to convert the audio portion of the virtual voice profile to the particular audio format (.wav, .pcm, .au, .mp3, wam, .qt, ra/ram, for example) that is compatible with the particular voice server 110, 112, 114 (Step 445). The training server adaptor 224 then transmits the text and the converted audio file to the particular voice server 110, 112, 114 via the communication network 140 according the particular communication protocol compatible with the particular voice server 110, 112, 114 (Step 450). Once the converted virtual voice profile has been sent to the particular voice server 110, 112, 114, the converted virtual voice profile is handled by a voice analyzer to create a voice spectrum file and tested to determine the profile's quality (Step 455). If the voice spectrum file is adequate, the process is finished and the user can now use the voice recognition feature of the particular device 150, 152, 154 that the voice profile was created for. If, on the other hand, the voice spectrum is inadequate or faulty, the voice server 110, 112, 114 contacts the feedback module 226 on the voice training server 120 to indicate that the voice profile is faulty. The voice training server 120, in turn, contacts the client 150, 152, 154 from which the voice profile creation was initiated. The user must perform the voice profile creation process again until the particular voice server 110, 112, 114 determines that the voice profile is adequate.

Figure 5:
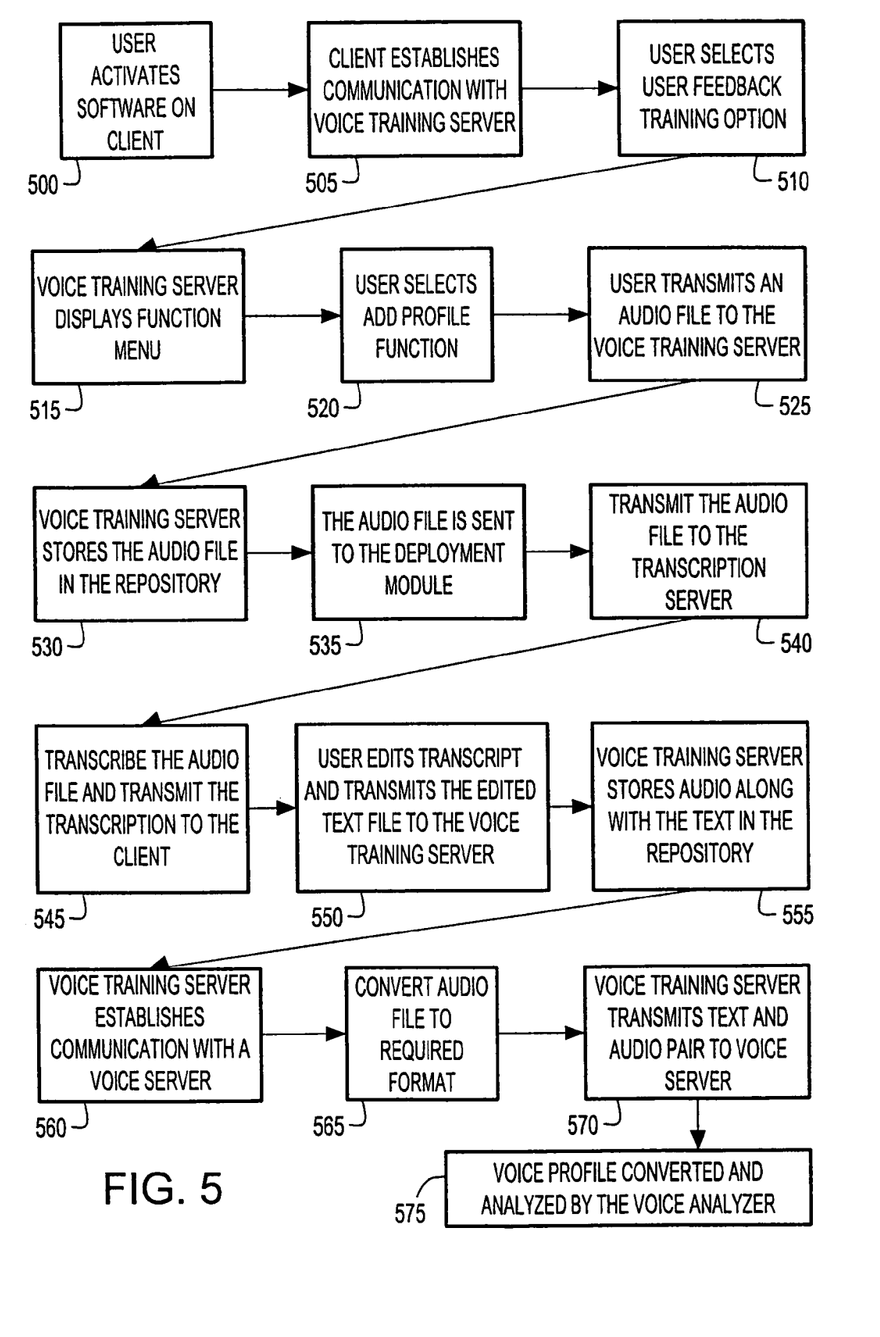
FIG. 5 is an illustrative flow diagram of the operation of a voice training system, according to still another embodiment of the invention.

Referring to FIGS. 1, 2, and 5, in another embodiment, the feedback training method for creating a user voice profile includes the following steps: a user operating a device (client 150, 152, 154), such as a cell phone, security system, or a home automation system, for example, activates the appropriate software (web browser with applet, specific web interface program, etc.) to initiate voice training for the particular client 150, 152, 154 (Step 500). The software on the client 150, 152, 154 establishes communication with the voice training server 120 via the communication network (Step 505). Once communication is established with the voice training server 120, the voice training server 120 presents the user with a choice of system initiated training, user initiated training, or feedback training. In this particular case, the user selects feedback training (Step 510), which activates the feedback training module 216.

Next, the function selection module 200 displays to the user a function menu (Step 515). The function menu includes such functions as add, delete, update, and select a virtual voice profile, as previously discussed above. The user then selects a function to execute, for example, add (create) a new virtual profile (Step 520). The user then transmits either a prerecorded audio file or reads user defined text aloud into the microphone associated with the client system 150, 152, 154 (Step 525). The audio file is then stored in the data repository 160 (Step 530). Thereafter, the audio file is sent to the deployment module 230 in the service module 220 (Step 535). The deployment module 230 then transmits the audio file to the transcription server 160 (Step 540). The transcription server 160 transcribes the audio into a text file and transmits the text back to the particular client 150, 152, 154 that created the audio file (Step 545). The user then corrects any transcription errors in the text file and transmits the text file to the voice training server 120 (Step 550). The voice training server 120 then stores the text file in the data repository 130 along with the audio file (Step 555). The text and audio pair is the virtual profile.

After the virtual profile has been created, or even after only a partial virtual profile has been created (discussed in detail below), the virtual voice profile is retrieved from the data repository 130 and the training server adaptor 224 within the service module 220 on the voice training server 120 establishes communication with a particular voice server 110, 112, 114 to determine the communication protocol and voice profile format that is compatible with the particular voice server 110, 112, 114 (Step 560). Next, the training server adapter 224 instructs the audio format converter 222 to convert the audio portion of the virtual voice profile to the particular audio format that is compatible with the particular voice server 110, 112, 114 (Step 565). The training server adaptor 224 then transmits the text and the converted audio file to the particular voice server 110, 112, 114 via the communication network 140 according the particular communication protocol compatible with the particular voice server 110, 112, 114 (Step 570). Once the converted virtual voice profile has been sent to the particular voice server 110, 112, 114, the converted virtual voice profile is handled by a voice analyzer to create a voice spectrum file and tested to determine the profile's quality (Step 575). If the voice spectrum file is adequate, the process is finished and the user can now use the voice recognition feature of the particular device 150, 152, 154 that the voice profile was created for. If, on the other hand, the voice spectrum is inadequate or faulty, the voice server 110, 112, 114 contacts the feedback module 226 on the voice training server 120 to indicate that the voice profile is faulty. The voice training server 120, in turn, contacts the client 150, 152, 154 from which the voice profile creation was initiated. The user must perform the voice profile creation process again until the particular voice server 110, 112, 114 determines that the voice profile is adequate.

In another embodiment, the user can create a virtual profile offline and later transmit the profile to the voice training system 120. This is accomplished by creating/selecting a text file, reading it aloud into a microphone (on a PDA or computer, for example), and storing the audio file in any one of a number of audio formats such as a .wav or .mp3 file. Thereafter the user transmits the text file and corresponding audio file to the voice training server 120. This method is particularly useful when the user does not have a connection to a network.

A benefit of this system is that the client device 150, 152, 154 does not have to have a large storage capacity (e.g. memory, hard disk), and a powerful CPU to create and store a voice training profile since the voice profile is stored remotely on a voice server 150, 152, 154. Further, the virtual voice profile, once created, can be converted into any format required by a particular voice server 110, 112, 114. Therefore, if the client 150, 152, 154 or the voice server 110, 112, 114 is changed, a new voice profile does not have to be created.

In another embodiment, the voice training server 120 offers the user the voice training material in sections. The user has the option of completing the voice training in one sitting, or the user can complete the voice training in stages, by reading aloud into the microphone one or more sections at a time. The user can then return later to continue or complete the voice training at his/her convenience. When a user chooses to complete only partially the voice training, the voice training server 120 stores a state or status marker indicating the state or status of the virtual profile. When the user returns at a later time to continue creating a virtual profile, the voice training server checks the state or status marker for the particular virtual profile and allows the user to continue from where he/she last finished. This process can continue until all the training material has been read and a complete audio file has been created.

In another embodiment, when a user updates a user profile, the notification module 228 in the service module 220 on the training server 120 notifies the particular voice server 110, 112, 114 that a particular voice profile has been updated. The training server 120 then transmits the updated voice profile to the particular voice server 110, 112, 114.

In other embodiments, the voice profile training and management system 100 includes a text auto-formatting feature. This feature automatically formats the text that is displayed to the user in a manner that makes the text easily readable based on the device that the text is displayed on. For example, the format of the displayed text will be different when the text is displayed on a twenty-one inch monitor in comparison to when the text is displayed on devices having small form factor displays, e.g., a PDA, or a cell phone screen. In one embodiment, the voice profile training and management system 100 automatically detects the type of device the text is to be displayed on and formats the text accordingly. In another embodiment, the user selects the type of device he/she will be using and the text is formatted in response to the user's selection. The benefit of this feature is that the user can comfortably read the training text regardless of the device used. For example, when using a cell phone screen, the text is formatted so that the user will not have to constantly scroll the text horizontally and vertically in order to read it. Instead, the text will be displayed so the user can read it and simply press a button to jump to a subsequent page.

Variations, modifications, and other implementations of what is described herein may occur to those of ordinary skill in the art without departing from the spirit and scope of the invention. Accordingly, the invention is not to be defined only by the preceding illustrative description.

The invention claimed is:

1. A method of creating a user voice profile compatible with a plurality of voice servers, comprising:

receiving text from a user;

receiving an audio representation of the text from the user;

creating a virtual profile by storing the text and the corresponding audio representation of the text in a data repository;

converting the text and the corresponding audio representation of the text into a format compatible with at least one of the plurality of voice servers;

providing the text and the corresponding audio representation of the text to the at least one of the plurality of voice servers;

detecting the type of display device used and automatically formatting the text based on the type of display device used;

receiving feedback regarding the quality of the provided text and corresponding audio representation of the text from the at least one of the plurality of voice servers; and providing to the at least one of the plurality of voice servers a notification when the text and corresponding audio representation of the text have changed.

* * * * *